United States Patent [19]
Miller et al.

[11] Patent Number: 5,385,688
[45] Date of Patent: Jan. 31, 1995

[54] ANTIFREEZE GEL COMPOSITION FOR USE IN A CABLE CONDUIT

[75] Inventors: Win R. Miller, Marine; Sheri H. Dahlke, Stillwater; John M. Fee, Scandia, all of Minn.

[73] Assignee: American Polywater Corporation, Stillwater, Minn.

[21] Appl. No.: 1,860

[22] Filed: Jan. 8, 1993

[51] Int. Cl.$^6$ ................................................ C09K 5/00
[52] U.S. Cl. ..................................... 252/73; 252/75; 252/49.3; 252/51.5 R; 252/70
[58] Field of Search ................... 252/70, 49.3, 56 R; 106/13

[56] References Cited

U.S. PATENT DOCUMENTS

| | | | |
|---|---|---|---|
| 4,378,299 | 3/1983 | Alexander | 252/49.3 |
| 4,673,516 | 6/1987 | Berry | 252/49.5 |
| 4,767,599 | 8/1988 | Mohr et al. | 422/13 |
| 4,772,408 | 9/1988 | Mohr et al. | 252/75 |
| 4,781,847 | 11/1988 | Weitz | 252/51.5 A |
| 4,822,901 | 4/1989 | Mohr et al. | 556/438 |
| 4,965,385 | 10/1990 | Jung et al. | 556/416 |
| 5,000,866 | 3/1991 | Woyciesjes | 252/78.3 |
| 5,019,414 | 5/1991 | Valdes | 426/573 |
| 5,073,283 | 12/1991 | Goddard et al. | 252/78.5 |
| 5,087,717 | 2/1992 | Jung et al. | 556/416 |
| 5,190,679 | 3/1993 | McDonald | 252/51.5 A |

*Primary Examiner*—Paul Lieberman
*Assistant Examiner*—Nicholes Ogden
*Attorney, Agent, or Firm*—Merchant, Gould, Smith, Edell, Welter & Schmidt

[57] ABSTRACT

An antifreeze gel composition is provided which is particularly useful in preventing ice formation and in dissolving ice already formed in a cable conduit line. The composition includes a water soluble antifreeze agent such as an alkylene glycol, a thickening agent, and water. A two-part chemical duct block kit for use in a cable conduit is also provided which includes the above antifreeze gel composition containing additional alkylene glycol in a first container, and a solid absorbing agent powder for aqueous liquids in a second container. When the powder is added to the antifreeze composition, a solid composition is formed which can block liquids and gels from passing through a conduit.

13 Claims, No Drawings

ANTIFREEZE GEL COMPOSITION FOR USE IN A CABLE CONDUIT

FIELD OF THE INVENTION

The invention relates generally to an antifreeze composition. More specifically, the invention relates to an antifreeze gel composition useful in preventing ice formation and in dissolving ice already formed in a cable conduit line exposed to freezing temperatures.

BACKGROUND OF THE INVENTION

Antifreeze and deicing fluids have been used for a number of years most notably in automotive engine systems and in deicing of aircraft. An antifreeze is a substance that is added to a liquid, usually water, to lower its freezing point. The largest single use of antifreeze is to protect liquid cooled internal combustion engines against freezing and consequent damage to the engine water jacket and the radiator. Various chemicals have been used in the past as antifreezes such as methanol, denatured ethanol, glycerol, calcium chloride, salt brines, and various glycols.

An acceptable antifreeze must satisfy many requirements. The most essential of these are the ability to lower the freezing point of water to the lowest winter operating temperatures likely to be encountered, satisfactory chemical stability and service, minimal effect on materials in contact with the antifreeze, and usefulness for at least one winter season. Although ethylene glycol is the most popular antifreeze today, several other substances are acceptable for special application.

Deicing chemical fluids are used chiefly for removing ice and frost from parked aircraft and from windows. The heated deicing chemical breaks the surface bonding of the ice which then can be readily removed by mechanical means, often by the force of the sprayed chemicals. Antiicing fluids are also used at airports after deicing has been completed to prevent subsequent ice formation on the cleaned surfaces. Antiicing is most often performed using a two-step procedure in which the aircraft is first deiced using a hot, high pressure fluid, and then antiiced using a cold fluid. Antiicing fluids serve to protect the cleaned surfaces from further accumulations of frozen deposits for a finite period of time.

Because of the time limited protection that deicing fluids provide, and because of the rapidly increasing air traffic and subsequent longer taxi times, thickened, non-Newtonian antiicing fluids are being used. These antiicing fluids contain glycols for freeze point depression, with added water, corrosion inhibitors, wetting agents, and stabilizers. These antiicing fluids also contain a polymeric thickening agent that gives the fluid its anti-icing properties and which increases the fluid's viscosity, allowing the fluid to adhere to the aircraft surfaces.

In recent years, cable lines have been installed across the country to provide communication lines and data transmission. Such cable lines include fiber optic lines which are used for high speed communication by transmitting light pulses as high bit rate digital signals. Conduits containing such fiber optic lines often run along railroad beds and are exposed to ambient air temperatures on railroad bridges which cross over highways, rivers, etc. Another place fiber optic cables are installed is in old unused gas pipelines. When installed in such old pipelines, fiber optic conduits are also exposed to ambient temperatures at stream crossings and other exposed areas.

It has been found that fiber optic lines show increased attenuation (signal degradation) during cold weather, limiting their ability to send high bit rate digital signals. During cold weather, ice forms in the water contaminated cable conduit lines which are exposed to subfreezing temperatures such as on railroad bridges over highways. The ice exerts pressure on the cable, causing microbending and increased attenuation of the fiber optic signal. It has been found that this phenomenon is reversible in that the fiber optic cable lines usually return to their normal attenuation when temperatures return to above freezing.

Several approaches have been tried to prevent water ingress and ice formation in cable conduits. Two-part liquid rubbers have been pumped into the conduits where they cure to form a water barrier. However, this procedure is very expensive and variations in cure and thickening rates make fill distances hard to control. Also, curable water impervious materials can actually trap existing ice against the cable by flowing and curing around it. Various water repellent greases have also been used which are heated, liquified, and pumped into the cable conduit. However, such materials are generally not compatible with cable jackets over the long term, are environmentally undesirable on leakage into the soil, and are difficult to control in their gelling times and behavior with existing ice and water in the conduit.

Therefore, the need exists for a composition which stays in a cable conduit and surrounds a cable therein, which does not adversely affect cable jackets or the environment, and which prevents ice formation from both water ingress and existing ice and water in the conduit.

SUMMARY OF THE INVENTION

The invention includes an antifreeze gel composition for use in a cable conduit. The composition comprises an effective amount of a water soluble antifreeze agent such as an alkylene glycol, an effective amount of a thickening agent, and a major proportion of water. The antifreeze gel composition is particularly useful in preventing ice formation and in dissolving ice already formed in a cable conduit line. A method for using the antifreeze gel composition comprises the step of disbursing the composition within a cable conduit to prevent ice formation therein. A blocking means may be provided for keeping the gel composition within a specified area within the conduit.

The invention also includes a two-part chemical duct block kit for use in a cable conduit line which includes the above antifreeze gel composition in a first container, and a solid absorbing agent powder in a second container. When the absorbing agent powder is added to the antifreeze composition, a solid blocking composition is formed which can block liquids and gels from passing through a conduit line. The solid blocking composition can be used as a blocking means to contain the antifreeze gel of the invention in a restricted area exposed to freezing temperatures, thus preventing gravitational flow of the gel to other areas of the cable conduit line not so exposed. In a method of use, the two parts of the chemical duct block composition are mixed together and the resulting mixture is inserted into a pumping line. Once pumped into the cable conduit at the desired location, the blocking composition thickens by itself into a dough-like, friable material. This allows for future cable removal since the blocking composition is easily dislodged.

The antifreeze gel composition of the present invention has several advantages and functions. The gel composition will fill the duct of a cable conduit surrounding the cable therein to prevent water ingress, and the gel does not freeze itself at normal winter temperatures. The gel also slowly dissolves existing ice in the conduit, and mixes with existing water in the conduit to prevent the water from freezing. The gel composition also does not adversely affect cable jackets or the environment.

One aspect of the invention is an antifreeze gel composition useful in preventing ice formation in a cable conduit. Another aspect of the invention relates to a two-part kit used to form a solid duct block composition for use in the cable conduit. A further aspect of the invention relates to methods of using the above gel composition and duct block composition kit.

DETAILED DESCRIPTION OF THE INVENTION

The invention includes an antifreeze gel composition for preventing ice formation in a cable conduit and dissolving ice already formed therein. The composition includes a water soluble antifreeze agent, a thickening agent, and water.

Antifreeze Agent

The gel composition of the present invention includes the effective amount of a water soluble antifreeze agent to provide antifreeze properties to the composition. A wide variety of antifreeze agents may be utilized in the present invention which have a desirable freezing point depression. Various hydroxy compounds may be used such as monohydric alcohols, diols, and triols. Examples of suitable hydroxy antifreeze agents include methanol, ethanol, isopropanol, glycols, and glycerol. Suitable ether compounds may also be utilized as antifreeze agents such as diethyl ether.

Preferred antifreeze agents for use in the present invention include various alkylene glycol compounds. The glycols contain two hydroxyl groups attached to separate carbon atoms in an aliphatic chain. Simple glycols are those in which both hydroxyl groups are attached to an otherwise unsubstituted hydrocarbon chain as represented by the general formula $C_nH_{2n}(OH)_2$. Glycols undergo reactions common to monohydric alcohols forming esters. acetals, ethers and similar products. Glycols also exhibit a low order of toxicity, have low vapor pressure at normal temperatures, and are not an inhalation hazard.

Alkylene glycols which can be used in the present invention include ethylene glycol, diethylene glycol, triethylene glycol, tetraethylene glycol, propylene glycol, dipropylene glycol, 1,3-butylene glycol, and various mixtures thereof. Preferred alkylene glycols for use in the invention include ethylene glycol, propylene glycol, and mixtures thereof. Ethylene glycol and propylene glycol markedly reduce the freezing point of water.

Ethylene glycol is a colorless, odorless, high boiling, hygroscopic liquid completely miscible with water and many organic liquids. Hydrolysis of ethylene oxide is the main commercial source of ethylene glycol. Diethylene glycol is similar in many respects to ethylene glycol but it contains an ether group. Diethylene glycol is the main coproduct of ethylene glycol manufacture and is preferably used in mixture with other glycols such as ethylene glycol and propylene glycol in the present invention. Triethylene glycol has chemical and physical properties essentially identical to those of diethylene glycol. Triethylene glycol is a coproduct of ethylene glycol produced by ethylene oxide hydrolysis. Tetraethylene glycol has properties similar to diethylene and triethylene glycols.

Propylene glycol is a clear, viscous, colorless liquid that is practically odorless and has a slight characteristic taste. It is produced by the hydrolysis of propylene oxide under pressure at high temperature without catalyst. Dipropylene glycol is a coproduct of propylene glycol and the hydrolysis of propylene oxide. 1,3-butylene glycol is a colorless, mildly bittersweet liquid which is manufactured by catalytic hydrogenation of acetaldol.

The composition of the present invention comprises about 20 to 80 wt %, preferably about 30 to 70 wt. %, and most preferably about 40 to 60 wt. % of the antifreeze agent.

Thickening Agent

The antifreeze composition of the present invention includes an effective amount of a thickening agent to gel the composition. A variety of thickeners may be utilized as the thickening agent in the composition of the invention as long as they are compatible with the antifreeze agent utilized. Various polymeric thickening agents may be utilized including polyacid thickeners such as acrylic acid polymers, pre-neutralized polyacids, gums such as guar gum, starches, modified starches, and celluloses. Non-polymeric thickeners may also be utilized. These include clays such as bentonite clay, and diatomaceous earth.

Preferred thickening agents for use in the present invention are acrylic acid polymer thickeners. Such thickening agents have a molecular weight of about 750,000 to 4,000,000. One such acrylic acid thickener useful in the invention is Carbopol® 940 available from the B. F. Goodrich Company. Carbopol® 940 is an acrylic acid copolymer having a molecular weight of approximately 4,000,000, and has excellent thickening efficiency at high viscosities and low concentrations.

Other preferred thickening agents for use in the present invention include various cellulose thickeners. Examples include methyl cellulose, ethyl cellulose, hydroxyethyl cellulose, and hydroxypropyl cellulose, which have a molecular weight of about 10,000 to 200,000.

The composition of the invention can comprise about 0.1 to 20 wt. %, preferably about 0.1 to 10 wt. %, and most preferably about 0.5 to 5 wt. % of the thickening agent.

Other Components

The composition of the invention is formulated using a major proportion of water in addition to the antifreeze agent and thickening agent. The water used is preferably deionized before it is employed in formulating the composition. The water can comprise about 20 to 90 wt. % of the composition, preferably about 20 to 80 wt. %, and most preferably about 40 to 60 wt. % of the composition.

The antifreeze composition of the present invention can optionally include an effective amount of a source of alkalinity. The source of alkalinity is preferably used to neutralize acid thickeners and can be conveniently selected from any compatible alkaline compound. Suitable sources of alkalinity include ammonia and ammonium hydroxide, alkali metal hydroxides such as sodium hydroxide and potassium hydroxide, amino compounds such as monoethanolamine, diethanolamine and triethanolamine, and alkali metal silicates such as sodium metasilicate and sodium orthosilicate, or mixtures thereof. The preferred alkaline source is an alkali metal hydroxide such as sodium hydroxide which can be obtained in aqueous solutions at a concentration of about 50 wt. % and in a variety of solid forms of varying particle sizes. Preferably, aqueous sodium hydroxide is employed when used in formulating the composition of the invention. The amounts of the alkaline source used are selected to optimally neutralize the acid thickener. The composition of the present invention can comprise about 0 to 5 wt. %, preferably about 0.5 to 5 wt. %, and most preferably about 1 to 2 wt. % of the source of alkalinity.

The antifreeze gel composition of the invention can optionally include a variety of typical additive components. These components can be employed singly or in a variety of mixtures in formulating the composition of the invention. Such components include dyes, antioxidants, stabilizers, corrosion inhibitors, perfumes, surfactants, etc.

A particularly preferred antifreeze gel composition of the invention comprises about 40 to 60 wt. % of an alkylene glycol such as propylene glycol, about 0.7 to 3 wt. % of a thickening agent such as an acrylic polymer thickener, about 0.6 to 3 wt. % of a source of alkalinity such as an aqueous alkali metal hydroxide, and about 40 to 60 wt. % of water.

The composition of the invention may be formulated by mixing the above components in any number of different ways to produce the gel antifreeze product. The gel composition has a pH of 3 to 9, preferably 6 to 8. The composition is a thick, viscous liquid or gel which is transparent, and can be clear or dyed.

The antifreeze gel composition of the present invention has several advantages and functions. The composition is non-toxic and non-sensitizing, has no harmful vapor emissions, and is safe for year-round use. Complete clean-up of the gel composition is possible utilizing water. The antifreeze gel of the invention has no flash point and dried residue is nonflammable. The viscosity of the composition of the invention ranges from about 100,000 to 350,000 centipoise, preferably from about 150,000 to 275,000 centipoise measured on a RVT Brookfield Viscometer using No. 7 spindle at 10 rpm.

In use, the gel composition will fill the duct of a cable conduit to prevent water ingress and the gel does not freeze itself. The gel also dissolves existing ice in the conduit, and mixes with existing water in the conduit to prevent the water from freezing. Thus, the gel composition prevents ice formation from both water ingress and from existing ice and water in the conduit. The gel composition will stay in a cable conduit and surround a cable therein, and does not adversely affect cable jackets or the environment. The composition can also be pumped up to a hundred feet into conduits in the normal ambient temperature variations found in field installations.

Chemical Duct Block Kit

The above antifreeze gel composition may be further utilized in a two-part chemical duct block kit. The two-part system is mixed and inserted in a pumping line and pumped through the line into a cable conduit. The duct block composition then hardens by itself into a solid dough-like, friable material which prevents liquids and gels from flowing through a cable conduit line.

The duct block kit includes one container holding a solid powder composition including water absorbent materials. Preferably, the absorbent materials are natural or synthetic polymers or combinations thereof. Examples of absorbent materials which can be utilized include the celluloses, flocculants such as polyacrylamides, and superabsorbent polymers such as various starch-graft copolymers. Preferred absorbent materials include the celluloses such as methyl cellulose, ethyl cellulose, hydroxyalkyl celluloses such as hydroxyethyl cellulose and hydroxypropyl cellulose, etc. A particularly preferred component for the solid powder of the kit is a hydroxyalkyl cellulose such as hydroxyethyl cellulose which is available from Hercules Inc. under the trade name Natrosol ®. Another preferred component of the absorbent powder of the kit is superabsorbent polymers such as various starch-graft polymers. A particularly preferred superabsorbent polymer is known as Water Lock ® D-212 which is a starch-graft copolymer containing grafted side chains consisting of 2-propenamide-co-2-propenoic acid and mixed sodium and aluminum salts. This polymer is available from Grain Processing Corporation. A preferred powder absorbent used in the duct block kit contains about 30 to 90 wt. %, preferably about 50 to 70 wt. % of a hydroxyalkyl cellulose, and about 10 to 70 wt. % preferably about 30 to 50 wt. % of a superabsorbent polymer.

The duct block kit also includes another container holding the antifreeze gel composition of the present invention with additional glycol added to reduce the viscosity of the composition to a range of about 50,000 to 200,000 centipoise. This part of the kit comprises about 60 to 90 wt. % of an alkylene glycol, about 0.5 to 3 wt. % of a polymeric thickening agent, about 0 to 3 wt. % of an alkali metal hydroxide, and about 10 to 40 wt. % of water.

In use, the first part (powder) of the kit is preferably added to the second part (liquid) for easiest mixing. Once the two parts have been mixed together, the resulting duct blocking composition is pumped into a cable conduit where it solidifies into a solid dough-like, friable material. This duct block material absorbs both water and the antifreeze gel present in the conduit. A preferred duct blocking composition in solid form comprises about 50 to 75 wt. % of an alkylene glycol, about 0.4 to 2 wt. % of a polymeric thickening agent, about 0.4 to 2 wt. % of an alkali metal hydroxide, about 8 to 12 wt. % of a hydroxyalky cellulose, about 5 to 9 wt-% of a superabsorbent starch-graft polymer, and about 20 to 30 wt. % of water.

METHODS OF USE

The antifreeze gel composition of the invention is particularly useful in preventing ice from forming in cable conduits or in dissolving ice already formed in the conduit. The composition has no deleterious effects on the physical or electrical properties of cable jackets. Based on testing of similar compounds using ASTM D1693, no environmental stress cracking of polyethylene (LDPE) cable jackets is expected when using the gel composition. There is also no more than a 30% change in Brookfield viscosity of the composition from about −20° F. to 100° F., providing for consistency in pumping application.

In using the gel antifreeze of the invention, the composition is dispersed within a cable conduit such that it remains in place to prevent ice formation in the conduit. Conduits in which the antifreeze gel of the invention can be used include innerduct carrying fiber optic cables. The innerduct is preferably a polyethylene, polyvinyl chloride, or metal pipe material.

A method for using the antifreeze gel composition comprises the step of dispersing the composition within a cable conduit line for preventing ice formation and dissolving ice in the conduit. The composition remains in the conduit for an extended period of time thereby preventing ice formation and dissolving ice therein. A blocking means for keeping the gel composition within a specified predetermined area within the conduit may be utilized. Such a blocking means can include a mechanical duct block such as a duct plug, or a chemical duct block such as provided by the duct block kit of the invention.

A variety of methods can be used to disperse the composition of the invention into a cable conduit system. A preferred method is to pump the composition using a high pressure grease pump through a hose which has been inserted the desired length into the conduit. The hose is slowly pulled from the conduit during pumping leaving a solid packing of the gel. The composition may be dispersed within the conduit at varying composition and conduit temperatures. The temperature use range is from about $-40°$ F. to $120°$ F.

An alternate use of the antifreeze gel composition of the invention is for providing a temporary, removable block in natural gas pipelines during emergency repair activities. To insure that gas does not leak from a cut pipe during repair, two diaphragms are inserted into the pipe with an open area between the diaphragms. The antifreeze gel is then pumped into the void, providing a heavy liquid barrier to the gas, but a temporary barrier which cleans right out with a rag. An antifreeze blocking material is required because, in freezing weather, a liquid which freezes has proven to be a poor gas barrier.

A method of blocking a cable conduit line using the duct block kit of the invention comprises the steps of mixing the absorbent powder composition with the antifreeze composition to form a blocking composition. The blocking composition is then pumped into a cable conduit line and allowed to solidify within the conduit. Thus, liquids and gels are prevented from flowing through the cable conduit line past the solidified blocking composition.

In utilizing the duct block kit of the invention, the mixed chemical duct block composition is inserted at both ends of the conduit in which the gel antifreeze composition of the invention is to be placed. The duct block acts as a sealant preventing the antifreeze gel from leaving the designated area of the conduit for preventing ice formation therein. In a method of use, the two parts of the chemical duct block composition are mixed together and the resulting mixture is inserted into the gel pumping line. Once pumped through the inserted hose into the cable conduit at the desired location, the blocking composition hardens by itself into place. The solid blocking composition can be used as a blocking means to contain the antifreeze gel of the invention in a restricted area exposed to freezing temperatures, thus preventing gravitational movement of the antifreeze gel or other liquids to other areas of the cable conduit line not so exposed.

The following examples disclose the preparation of the antifreeze gel composition and duct block kit of the invention and include a best mode.

EXAMPLE 1

The composition of Example 1 was made by mixing the ingredients listed in Table I below in the given amounts. The composition of Example 1 was a thick, viscous gel material.

TABLE I

| Ingredient | Amount of Ingredient |
| --- | --- |
| Deionized water | 48.6 wt % |
| Propylene glycol | 48.6 wt % |
| Acrylic thickener | 1.5 wt % |
| Sodium hydroxide | 1.3 wt % |

EXAMPLE 2

A two-part chemical duct block kit was made containing the ingredients and amounts listed in Table II below. Parts A and B were placed in separate plastic bottles for further use.

TABLE II

| Ingredient | Amount of Ingredient |
| --- | --- |
| Part A | |
| Hydroxyethyl cellulose | 20 grams |
| Starch-graft copolymer (superabsorbent) | 10 grams |
| Part B | |
| Propylene glycol | 70 grams |
| Example 1 | 90 grams |

The following steps are taken in inserting the duct block composition into a cable conduit using the above duct block kit of the invention. The duct block kit includes the following additional components:

3 * ½ inch ID hoses with inch male connectors installed;
3 * ½ inch male-to-male nipples;
3 * ½ inch female-to-female couplers;
2 * ½ inch straight-through couplers (female);
6 * ½ inch straight-through couplers (male);
1 roll Teflon ® tape.

The above components are used to make an easily accessible quick-connect hose between the pump and the gel delivery hose, which may be put in place after loading with the duct block product mixture. A male nipple is used on each end of the insertion hose to avoid losing the o-ring gasket on the female coupler when cleaning the hose. After pushing the gel delivery hose through the conduit to the proper location, one bottle of duct block product is mixed by adding Part A (powder) to Part B (liquid). A cap is secured on the bottle and the mixture is shaken for about 15 seconds. It is preferable to add powder liquid for easiest mixing. If the liquid is added on top of the powder, the bottle will need to be shaken longer until there are no lumps. The neck of the bottle is then slid over the male quick-connect nipple of the spare insertion hose with quick-connects attached. The bottle is then squeezed while holding it slightly elevated and a close eye is kept on the other end of the hose to see when the duct block composition reaches the other end. When the composition reaches the other end, a thumb is put over it to prevent duct block liquid escape, but air is allowed to escape as needed. The entire bottle of duct block product Is squeezed into the hose until the hose is full or the bottle is empty. Care should be used to not spill any duct block product from the hose which is then quick connected into the delivery system between the pump and the gel delivery hose. Pumping is then begun as usual, and the duct block liquid is pumped through the gel delivery hose into the conduit. The spare hose should be cleaned and kept free of dirt and contaminants to be ready for the next use.

Testing of Example 1

The antifreeze gel composition of Example 1 was tested using a polyethylene stress crack test on two stress-crack prone polyethylenes (types DYNK and DYNH from Union Carbide). Testing was done following ASTM D1693, Condition A. The DYNK and DYNH polyethylene platens were one to two years old. A new razor blade was placed into the nicking jig and polyethylene test samples were cut. Example 1, which contained 1.5 wt. % Carbopol ® acrylic thickener neutralized with sodium hydroxide in a 50:50 mixture of water and propylene glycol, was dyed to a light red color prior to the test. The stressed polyethylene samples were immersed in the composition of Example 1 to perform the stress-crack test. Results of the stress-crack test are shown below in Table III. This test was continued for six-plus months with no cracking occurring.

TABLE III

| Gel Sample | Polyeth. Type | Stress-Crack Test Time of Contact | | | | |
|---|---|---|---|---|---|---|
| | | 4 Hours | 20 Hours | 27 Hours | 44 Hours | 6 months |
| Examp.1 | DYNK | No cracks | No cracks | No cracks | No cracks | No cracks |
| Examp.1 | DYNH | No cracks | No cracks | No cracks | No cracks | No cracks |

Flash point testing of the antifreeze gel product of the invention was also carried out. In the flash point test, no flash point below the temperature at which the gel bubbled out of the cup (81–83° C.) was observed in the composition of Example 1. A flash point test was also run for a 50:50 mixture of propylene glycol and water (not gelled). There was no flash point up to the boiling point of this mixture which was found to boil at about 104° C. This would indicate that there is no flash point up to the lowest boiling point for the gel product of Example 1 and that this product is not a combustible material.

Freeze point testing and observations were also carried out on the gel composition of Example 1. The composition was found to thicken slightly at about 20° F. with cloudiness and crystals forming by −20° F. At −50° F. the composition became much thinner. The composition was allowed to become totally white (frozen ice crystals) and had a viscosity at this point of about 30,000 to 50,000 cps. Three days after freezing, the composition of Example 1 was brought back to room temperature, and formed a gel having a viscosity of about 124,000 cps.

Ice dissolving studies were also carried out using the antifreeze gel composition of Example 1. The antifreeze gel of Example 1 was cooled to 5° F. An ice cube also at 5° F. was put into the gel of Example 1 and the whole thing was stored at 5° F. The ice cube was observed to slowly dissipate into the gel. By running a freeze/thaw cycle, the ice cube turned into a slush which completely dissipated after a few more cycles.

The foregoing description and examples are illustrative of the invention. However, since many embodiments of the invention can be made without departing from the spirit and scope of the invention, the invention resides wholly in claims hereinafter appended.

We claim:
1. A chemical duct block kit comprising:
   (a) a first container holding an antifreeze gel composition comprising:
      (i) about 60 to 90 wt. % of an alkylene glycol;
      (ii) about 0.5 to 3 wt % of a polymeric thickener;
      (iii) about 0 to 3 wt % of an alkali metal hydroxide; and
      (iv) about 10 to 40 wt % of water; and
   (b) a second container holding a solid absorbent powder composition comprising:
      (i) about 30 to 90 wt % of a hydroxyalkyl cellulose; and
      (ii) about 10 to 70 wt % of a superabsorbent starch-graft polymer;
   wherein a said blocking composition is formed when said antifreeze gel composition is combined with said absorbent composition.

2. The duct block kit of claim 1 wherein said alkylene glycol is selected from the group consisting of ethylene glycol, propylene glycol, diethylene glycol, triethylene glycol, tetraethylene glycol, dipropylene glycol, 1,3-butylene glycol, and mixtures thereof.

3. The duct block kit of claim 1 wherein said polymeric thickener is selected from the group consisting of polyacid thickeners, gums, starches, modified starches, and celluloses.

4. The duct block kit of claim 1 wherein said alkali metal hydroxide is selected from the group consisting of sodium hydroxide, potassium hydroxide, and mixtures thereof.

5. The duct block kit of claim 1 wherein said antifreeze gel has a viscosity of about 50,000 to 200,000 centipoise.

6. A chemical duct block composition in solid form comprising:
   (a) about 50 to 70 wt % of an alkylene glycol;
   (b) about 0.4 to 2 wt % of a polymeric thickener;
   (c) about 0.4 to 2 wt % of an alkali metal hydroxide;
   (d) about 8 to 12 wt % of a hydroxyalkyl cellulose;
   (e) about 5 to 9 wt % of a superabsorbent starch-graft polymer; and
   (f) about 20 to 30 wt. % of water.

7. The composition of claim 6 wherein said alkylene glycol is selected from the group consisting of ethylene glycol, propylene glycol, diethylene glycol, triethylene glycol, tetraethylene glycol, dipropylene glycol, 1,3-butylene glycol, and mixtures thereof.

8. The composition of claim 6 wherein said thickener is a polyacid thickener.

9. The composition of claim 6 wherein said alkali metal hydroxide is selected from the group consisting of sodium hydroxide, potassium hydroxide, and mixtures thereof.

10. The composition of claim 6 wherein said composition is a solid friable material.

11. A method of retaining an antifreeze gel composition in a predetermined section of a cable conduit line, comprising the steps of:
 (a) mixing an absorbent powder composition comprising:
  (i) about 30 to 90 wt % of a hydroxyalkyl cellulose; and
  (ii) about 10 to 70 wt % of a superabsorbent starch-graft polymer with an antifreeze comprising:
  (i) about 60 to 90 wt % of an alkylene glycol;
  (ii) about 0.5 to 3 wt % of a polymeric thickener to form a blocking composition;
  (iii) about 0 to 3 wt % of an alkali metal hydroxide; and
  (iv) about 10 to 40 wt % of water.
 (b) pumping said blocking composition into a cable conduit line; and
 (c) allowing said blocking composition to solidify within said cable conduit line, thereby preventing liquids and gels from flowing through the cable conduit line past the solid blocking composition.

12. A method for preventing ice formation and dissolving ice in a cable conduit comprising the steps of:
 (a) pumping through a hose inserted into a conduit an antifreeze gel composition consisting essentially of:
  (i) about 30 to 70 wt % of a water soluble freezing point depressant;
  (ii) an effective amount of a thickener; and
  (iii) a major portion of water, through a hose into a cable conduit line,
 (b) pulling the hose from the conduit leaving a solid packing of the antifreeze gel, wherein said antifreeze gel remains in said cable conduit, thereby preventing ice formation and dissolving ice within said conduit.

13. A method for preventing ice formation and dissolving ice in a cable conduit comprising the steps of:
 (a) pumping through a hose inserted into a conduit an antifreeze gel composition consisting essentially of:
  (i) about 30 to 70 wt % of an alkylene glycol;
  (ii) about 0.5 to 5 wt % of an acrylic polymeric thickener;
  (iii) about 0.5 to 5 wt % of an alkali metal hydroxide; and
  (iv) about 20 to 80 wt % of water; through a hose into a cable conduit line,
 (b) pulling the hose from the conduit leaving a solid packing of the antifreeze gel, wherein said antifreeze gel remains in said cable conduit, thereby preventing ice formation and dissolving ice within said conduit.

* * * * *

UNITED STATES PATENT AND TRADEMARK OFFICE
CERTIFICATE OF CORRECTION

PATENT NO. : 5,385,688
DATED : January 31, 995
INVENTOR(S) : Win R. Miller, et al.

It is certified that error appears in the above-identified patent and that said Letters Patent is hereby corrected as shown below:

On column 3, line 30, please delete "the" and substitute therefore --an--

On column 8, line 38, please insert --3/4-- after the word "with"

On column 8, line 50, please delete "o-ring" and substitute therefore --O-ring--

On column 8, line 56, please insert --to-- after the word "powder"

On column 8, line 67, please delete "Is" and substitute therefore --is--

On column 10, line 18 (claim 1), please delete "said" and substitute therefore --solid--

On column 10, line 20 (claim 1), please insert --powder-- after the word "absorbent"

Signed and Sealed this

Ninth Day of May, 1995

Attest:

BRUCE LEHMAN

*Attesting Officer*    *Commissioner of Patents and Trademarks*